Figure 1:
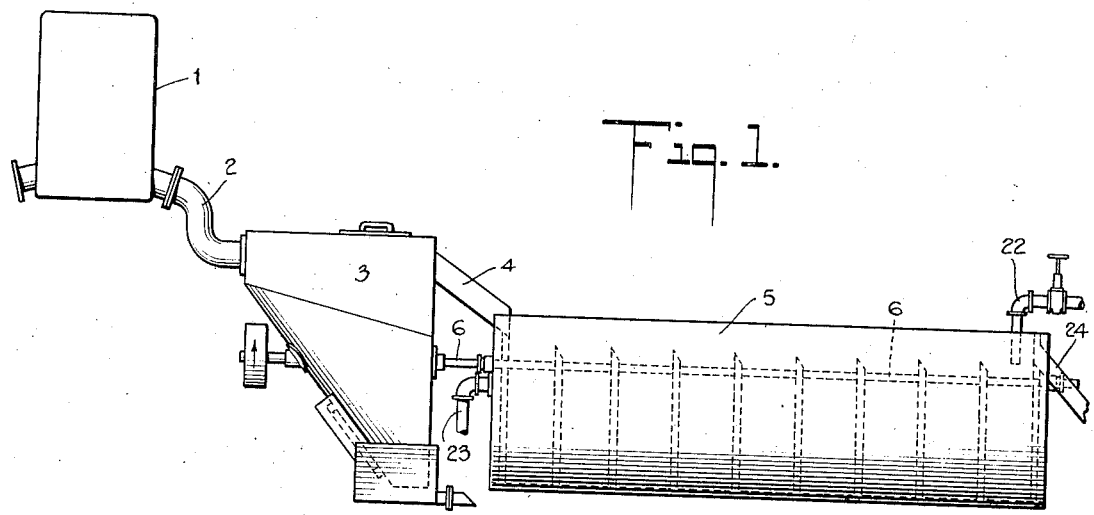

April 30, 1935.  C. I. HANEY  1,999,411
METHOD OF AND MEANS FOR TREATING SOLIDS
Filed Dec. 9, 1930   2 Sheets-Sheet 1

INVENTOR
Clifford I. Haney
BY
ATTORNEYS

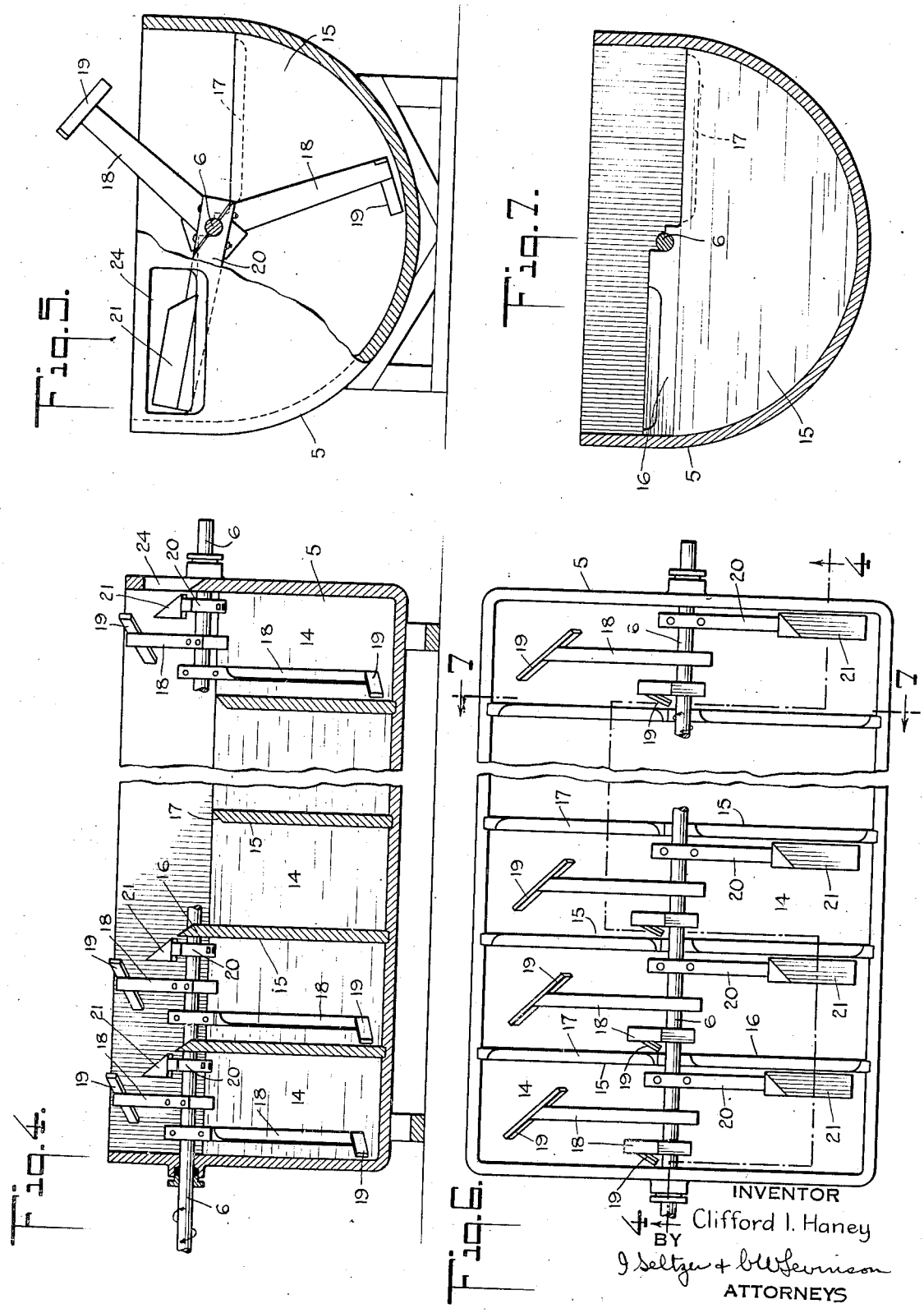

Patented Apr. 30, 1935

1,999,411

UNITED STATES PATENT OFFICE 1,999,411

METHOD OF AND MEANS FOR TREATING SOLIDS

Clifford I. Haney, Drummondville, Quebec, Canada, assignor to Celanese Corporation of America, a corporation of Delaware Application December 9, 1930, Serial No. 501,017

6 Claims. (Cl. 259—9)

This invention relates to method of and means for treating solid materials with liquids in a continuous manner.

An object of my invention is to provide means for continuously treating solid material in the form of particles of different sizes with a treating liquid. A further object of my invention is to provide means for continuously washing cellulose acetate which has been precipitated from a solution in acetic acid, whereby the resulting washed liquors are of high acid concentration and the cellulose acetate is washed substantially free of acetic acid. Other objects of this invention will appear from the following detailed description.

The present method of washing cellulose acetate that has been precipitated from its solution in acetic acid is by a batch method. This batch method requires a large number of vats, centrifugals and other apparatus, and because of the great amount of handling of material involved, the labor cost is quite high. Moreover the acetic acid is so diluted by washing with water in the batch method, that the cost of concentrating and recovering the acetic acid is very high.

Cellulose acetate, precipitated from its solution in acetic acid, often varies greatly from charge to charge and is in a great variety of forms. The particle sizes often run from the dimension of dust to coarse pieces, 5 or 6" long. It is therefore quite difficult to provide means for washing this material in a continuous manner, especially as the diffusion of the acid from the precipitated cellulose acetate is not rapid during washing.

I have found that cellulose acetate or other solid material in particle or fibre form may be treated with a liquid in a continuous manner, by causing the same to pass through a series of cells or compartments by means of propelling paddles, while causing the treating liquid to flow in a counter-current direction through such cells.

In accordance with my invention, I treat a solid material with a treating liquid in a continuous manner by causing the solid material to pass continuously through a series of cells by suitable propelling means while causing the treating liquid to pass in an opposite direction through such cells.

While this invention is of particular importance in the treatment of cellulose acetate or other cellulose esters which have been precipitated from the solutions in which they were formed, it is applicable to the treatment of other materials such as cellulose nitrate, cellulose ethers and in fact any other solid material that is in the form of particles, particularly in the form of particles of varying size.

The solid material may be subjected to the action of any treating liquid, such as water for washing, or the treating liquid may have a chemical or physical action thereon and may be in the form of chemical liquids or aqueous solutions of chemicals.

For illustration of one mode of carrying out this invention, reference is had to the accompanying drawings which show a form of apparatus for removing excess acid from and washing cellulose acetate as formed by the precipitation of a solution of cellulose acetate in acetic acid by the addition of water to an acetylation mixture.

Figure 2:
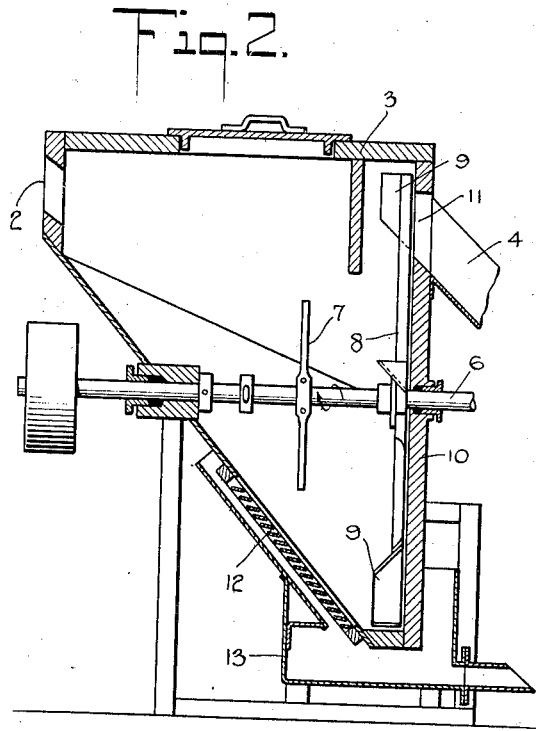
Figure 3:
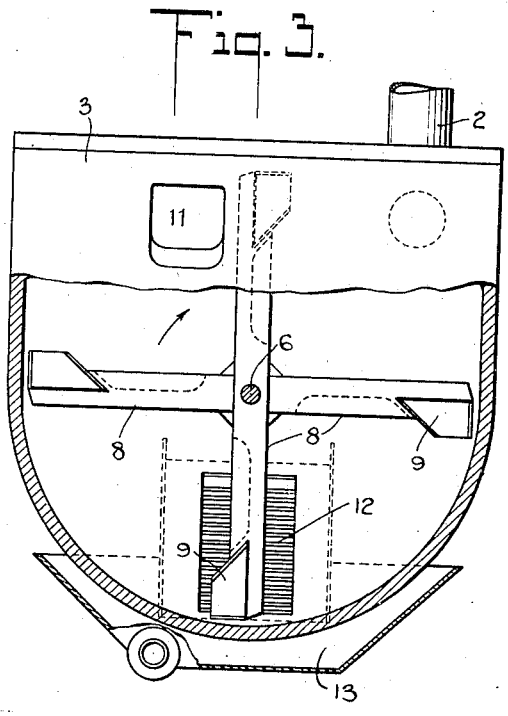

Fig. 1 shows a front elevation of the assembly of apparatus including the supply tank, the drainer and the washer, Fig. 2 is a vertical cross-section of the drainer, Fig. 3 is an end elevation partly in section of the drainer, Fig. 4 is a vertical cross-section of the washer taken along the line 4—4 of Fig. 6, Fig. 5 is an end elevation, partly in section, of the washer, Fig. 6 is a plan view of the washer, and Fig. 7 is a cross-section of the washer taken along the line 7—7 of Fig. 6.

The assembly of the apparatus shown on the drawings includes a supply tank 1 for the mixture of cellulose acetate and diluted acetic acid, a conduit 2 for conducting the mixture to the draining device 3, and chute 4 for conducting the drained cellulose acetate from the drainer 3 to the washer 5.

All the parts of the apparatus may be made of wood, or they may be made of copper, bronze, stainless steel, aluminum, monel metal or other acid resisting materials.

Referring to Figs. 2 and 3, the drainer 3 has a shaft 6 rotating therein, which shaft preferably projects through the washer 5, so that both the drainer and the washer may be operated together. On the shaft 6 in the drainer, agitating arms 7 are mounted for stirring the material contained therein. Near the exit end for the cellulose acetate of the drainer, arms 8 are mounted on the shaft 6, and these arms carry conveying paddles 9, the faces of which preferably make an angle of about 30° with the rear wall 10 of the drainer, so that the cellulose acetate material which is picked up by the paddles 9 tends to slide down the opening 11 in such wall into the chute 4. The paddles 9 are spaced somewhat from the wall 10 to permit the drainage of liquor from the cellulose acetate before it is dropped into the chute 4.

The drainer 3 is provided with a sloping bottom, the lower part of which is in the form of spaced slats or bars 12, or in the form of a foraminous or perforated material. The liquor that drains from the cellulose acetate through the slats or bars 12 is caught in the receptacle 13, from which it may be conducted to any desired storage or treating device.

Referring to Figs. 4 to 7, the washer 5 is divided into a series of compartments or cells 14 of any desired number (9 are shown on the drawings) by means of the partitions 15, one side 16 of which is higher than the other side 17. The upper edges of the partitions 15 are preferably cut at an angle as shown in the drawings.

Mounted on the rotating shaft 6 are a series of arms 18 which carry paddle arms 19, the faces of which are preferably set at an angle of about 60° to the direction of travel and which are adapted to cause the cellulose acetate to move across the compartments or cells 14.

Near the partitions 15, arms 20 are mounted on the rotating shaft 6, one arm being provided in each cell 14. Upon these arms 20, wedge-shaped paddles 21 are fixed, one face of such paddle being so positioned, that it makes an angle of about 30° with the plane of the partitions, so that as the paddles pass through the mixture of cellulose acetate and liquor in the cells, they lift some of the cellulose acetate above the liquid level, and the cellulose acetate so caught slips down the face of the paddle over the angular edge of the partition 15 when the lower edge of the paddle comes above the upper edge of the partition.

To permit the drainage of adhering liquor from the cellulose acetate, the paddles 21 are spaced somewhat from the partition 15, so that as the cellulose acetate is lifted by the paddles 21 above the liquid level, practically all of the free liquor drains away before the upper edge of the partition is reached. By means of this arrangement, the cellulose acetate acts as its own draining screen, and the greatest problem of a continuous washing scheme for such product, which contains particles of all sizes, is overcome.

Water or any other desired washing liquid is introduced through the inlet 22 and the liquor is withdrawn through the outlet 23, while the cellulose acetate material passes in a counter-current direction, entering by the chute 4 and leaving by chute 24. In order to permit the flow of liquid in the manner indicated, the height of the partitions 15 progressively decreases to a slight extent from the end where the liquid enters by pipe 22 to the end where the liquor leaves by pipe 23.

The following is a specific example, which is in no way limitative, of a method of draining and washing cellulose acetate which has been precipitated by the addition of water to an acetylation mixture comprising a solution of cellulose acetate in acetic acid.

The mixture of precipitated cellulose and acetic acid which is of about 40 to 45% concentration is passed from the vessel 1 to the drainer 3, wherein the free acid liquor drains through the spaced slats or bars 12, into the receptacle 13 from which it may be drawn off to be mixed with the liquor from the washer 5. The shaft 6 rotates at appropriate speed and the rotating arms 7 keep the mass agitated. The paddle 9 on the rotating arms 8 lift an amount of cellulose acetate and because of the angle of the face of the paddle 9, the lifted cellulose acetate slides down the opening 11 into the chute 4 which conducts it to the washer 5.

In the washer 5, fresh water is fed by pipe 22 and this water fills all the compartments, flowing over the lower edges 17 of the partitions 15 until the liquor outlet 23 is reached. The cellulose acetate from the drainer 3 passes into the first compartment 14, where it is washed with the liquor therein, and is then caused to move gradually by the rotating paddles 19 towards the partition 15. In rotating, the wedged-shaped paddles 21 lift a portion of the cellulose acetate material above the liquid level, and during the time when the cellulose acetate is passing from the liquid level to the upper edge of the higher portion 16 of the partition, the free liquor drains down through the space between the paddle 21 and the partition 15. Upon reaching the upper edge of the partition 15, because of the angle the face of the paddle makes with the horizontal and the angle of the upper edge of the partition, the cellulose acetate easily slides down into the next compartment 15. This operation is repeated in each of the compartments, the cellulose acetate being washed with progressively fresher liquor, while the more concentrated liquor comes in contact with cellulose acetate that has the larger content of acid. By this counter-current principle, the cellulose acetate leaving the washer 5 through the chute 24 is substantially free of acid, while the liquor leaving the pipe 23 is of relatively high concentration.

The shaft 6 is rotated at such speed that the cellulose acetate is subjected to the required degree of washing before it leaves the washer, the time required for the cellulose acetate to pass through the washer being from 2 to 24 hours.

The acid liquor from the pipe 23 of the washer may be mixed with the drained acid liquor collected in receptacle 13 from the drainer 3, and this mixture may be treated by extraction with solvents, by distillation, or neutralization with alkaline material, to recover concentrated acetic acid or other desired products.

While this invention has been described specifically in connection with the draining and washing of cellulose acetate that has been precipitated from its solution in acetic acid, it is adapted for the treatment of any kind of solid material in more or less divided form with any liquid. Thus cellulose acetate or cellulose nitrate or other derivative of cellulose may be stabilized in the washer 5, by causing the same to pass through the cells where it is first subjected to boiling water in the first few cells, then to a very dilute solution of hot mineral acid in other cells, and then to final washing in the last cells.

A machine of this type may also be used for treating cellulose acetate or other derivatives of cellulose with liquids, such as solutions of soluble salts of alkali or alkali earth metals, or solutions of aluminum salts, such as aluminum chloride, adapted to react chemically therewith or to exert any other desired action.

It is to be understood that the foregoing detailed description is given merely by way of illustration and that many variations may be made therein without departing from the spirit of my invention.

Having described my invention, what I claim and desire to secure by Letters Patent is:

1. Method of treating cellulose acetate in particle form with a liquid comprising feeding the cellulose acetate to the first of a series of cells, causing the cellulose acetate to be moved across said cells, raising the cellulose acetate above the liquid level in the cells and permitting free liquid to drain therefrom, then passing the cellulose acetate to the next cell, while causing the liquid to pass in a counter-current direction through said cells.

2. Method of removing acid from cellulose acetate in particle form containing the same comprising passing the mixture of cellulose acetate and acid into a draining device, continuously passing the drained cellulose acetate to a washer comprising a series of cells, lifting the cellulose acetate above the liquid level in the cells and permitting free liquid to drain therefrom, then passing the material to the next cell, while passing water in a counter-current direction through said cells.

3. In apparatus for treating solid material with a liquid in a continuous manner, the combination of a series of cells, means for feeding the material to the first of said cells, a shaft passing through the cells and means for rotating said shaft, arms attached to said shaft, means on said arms for propelling the material longitudinally of said cells, further arms on said shaft and carrying paddles adapted to raise the material above the liquid level and drop the same into the next cell, and means for passing liquid in a continuous manner through said cells.

4. In apparatus for treating solid material with a liquid in a continuous manner, the combination of an elongated vessel, partitions in said vessel dividing the same into a series of compartments, one side of the partitions being lower than the other, a shaft passing through said vessel and means for rotating said shaft, arms attached to said shaft, means on said arms for propelling the material longitudinally of said cells, further arms on said shaft and carrying paddles adapted to raise the material above the liquid level and drop the same into the next cell, and means for passing liquid in a counter-current direction through said cells.

5. In apparatus for separating a liquid from a solid material in a continuous manner, the combination of a drainer, means for introducing material to the drainer, means for continuously removing the material from the drainer to a washer, said washer comprising a series of cells, means for feeding the material to the first of said cells, a shaft passing through the cells and means for rotating said shaft, arms attached to said shaft, means on said arms for propelling the material longitudinally of said cells, further arms on said shaft and carrying paddles adapted to raise the material above the liquid level and drop the same into the next cell, and means for passing liquid in a continuous manner through said cells.

6. In a device for draining liquid from a mixture of solid material and liquid, the combination of a substantially closed vessel having an outwardly sloping bottom, spaced bars or slats forming at least part of said bottom, a rotating shaft passing through said vessel, agitating means attached to said shaft, arms attached to said shaft, and paddles on said arms adapted to raise the solid material and drop the same into the outlet of the vessel.

CLIFFORD I. HANEY.